United States Patent [19]

Metzger et al.

[11] 4,427,340
[45] Jan. 24, 1984

[54] SOFT INPLANE BEARINGLESS HELICOPTER ROTOR

[75] Inventors: Robert W. Metzger, Hurst; William D. Neathery, Fort Worth; Peter A. Reyes, Watauga; Patrick R. Tisdale, Bedford; Cecil E. Covington, Hurst; Willem Broekhuizen, Arlington, all of Tex.

[73] Assignee: Bell Helicopter Textron Inc., Forth Worth, Tex.

[21] Appl. No.: 373,525

[22] Filed: Jun. 24, 1982

[51] Int. Cl.³ .......................................... B64C 27/38
[52] U.S. Cl. .............................. 416/141; 416/134 A; 416/244 R
[58] Field of Search ............... 416/134 A, 141, 138 A, 416/244 R, 230 A

[56] References Cited

U.S. PATENT DOCUMENTS

| | | | |
|---|---|---|---|
| 2,830,669 | 4/1958 | Klockner | 170/160.42 |
| 3,228,481 | 1/1966 | Eldred | 170/160.58 |
| 3,384,185 | 5/1968 | Fernandez | 170/160.53 |
| 3,669,566 | 6/1972 | Bourquardez et al. | 416/134 |
| 3,695,779 | 10/1972 | Kastan et al. | 416/138 A |
| 3,765,267 | 10/1973 | Bourquardez et al. | 74/581 |
| 3,807,896 | 4/1974 | Johnson | 416/102 |
| 3,874,815 | 4/1975 | Baskin | 416/134 |
| 3,880,551 | 4/1975 | Kisovec | 416/134 |
| 3,967,918 | 7/1976 | Mouille et al. | 416/141 |
| 4,008,980 | 2/1977 | Noehren et al. | 416/134 |
| 4,012,169 | 3/1977 | Mouille et al. | 416/134 |
| 4,047,839 | 9/1977 | Ferris et al. | 416/134 |
| 4,053,258 | 10/1977 | Mouille | 416/141 X |
| 4,077,740 | 3/1978 | Sobey | 416/230 |
| 4,227,857 | 10/1980 | Reyes | 416/134 |
| 4,244,677 | 1/1981 | Noehren et al. | 416/134 A |
| 4,252,504 | 2/1981 | Covington et al. | 416/143 |
| 4,257,739 | 3/1981 | Covington et al. | 416/134 |
| 4,273,511 | 6/1981 | Mouille et al. | 416/134 A |
| 4,293,276 | 10/1981 | Brogdon et al. | 416/134 |
| 4,293,277 | 10/1981 | Aubry | 416/134 A |
| 4,306,837 | 12/1981 | Brogdon et al. | 416/134 |
| 4,332,525 | 6/1982 | Cheney | 416/134 A |
| 4,381,902 | 5/1983 | Head et al. | 416/134 A |

FOREIGN PATENT DOCUMENTS

| | | | |
|---|---|---|---|
| 2903524 | 8/1980 | Fed. Rep. of Germany | 416/134 A |
| 2001026 | 1/1979 | United Kingdom | 416/134 A |

Primary Examiner—Everette A. Powell, Jr.
Attorney, Agent, or Firm—Richards, Harris & Medlock

[57] ABSTRACT

The present invention is directed to a unitary multi-bladed soft inplane bearingless helicopter rotor particularly adaptable in a main rotor. A unitary yoke has a flat hub adapted to be anchored to the end of a mast with diametrically opposed blade-supporting arms extending from the hub. Each arm has a thin flapping section adjacent to the hub with a feathering section extending outboard from the flapping section. The feathering section terminates in tangentially-spaced blade bolt attachment structures. Each feathering section comprises plural fiber-reinforced composite ribs spaced apart inplane with a central web extending inplane between the ribs to integrate the ribs into a unitary structure.

13 Claims, 14 Drawing Figures

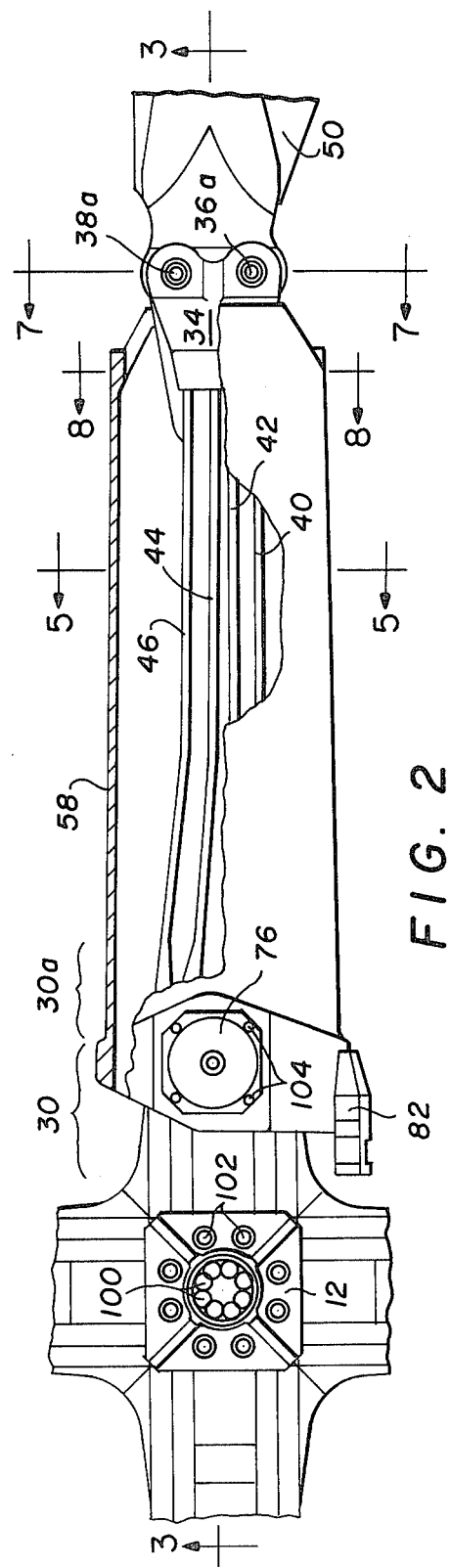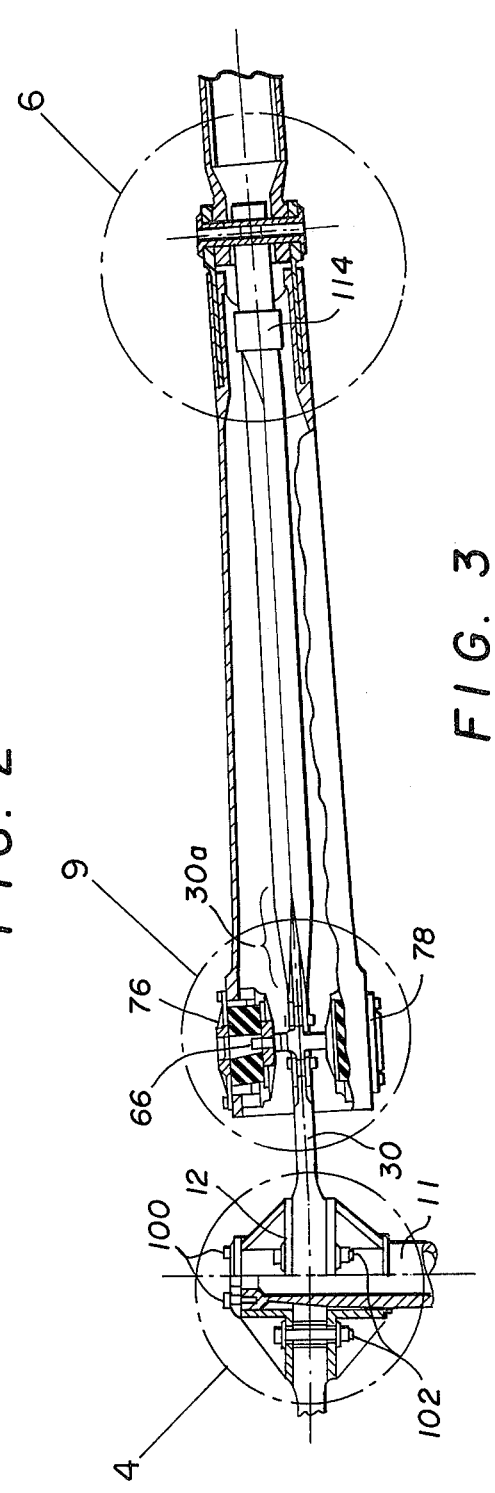

SOFT INPLANE BEARINGLESS HELICOPTER ROTOR

BACKGROUND ART

Soft inplane helicopter rotor mountings have been heretofore known. A representative system is shown in U.S. Pat. No. 4,257,739 in which elastomeric thrust and elastomeric inboard bearings provide soft inplane operation while accommodating pitch change.

Laminated composite rotary yoke structures have also been known. A representative system is shown in U.S. Pat. No. 4,293,276 wherein a composite laminated rotary yoke provides for a bearingless type of installation.

U.S. Pat. No. 4,306,837 discloses a bearingless tail rotor structure for helicopters wherein flex sections for feathering purposes are provided through a fiber-reinforced composite tension-bearing strap extending spanwise.

DISCLOSURE OF THE INVENTION

The present invention is directed to a unitary multibladed soft inplane bearingless helicopter rotor particularly adaptable in a main rotor. A unitary yoke has a flat hub adapted to be anchored to the end of a mast with diametrically opposed blade-supporting arms extending from the hub. Each arm has a thin flapping section adjacent to the hub with a feathering section extending outboard from the flapping section. The feathering section terminates in tangentially-spaced blade bolt attachment structures. Each feathering section comprises plural fiber-reinforced composite ribs spaced apart inplane with a central web extending inplane between the ribs to integrate the ribs into a unitary structure.

A blade is secured to each attachment structure and has a cuff extending inboard to the flapping section. Bearing structure interconnects the inboard end of the cuff and the flapping section by resilient means for soft inplane restraint of the blade applied through the cuff.

BRIEF DESCRIPTION OF THE DRAWINGS

For a more complete understanding of the present invention, reference may now be had to the following description taken in conjunction with the accompanying drawings in which:

FIG. 2 is a top view partially in section illustrating one of the four arms of the system of FIG. 1;

FIG. 3 is a side view partially in section of the arm of FIG. 2 as taken along lines 3—3 of FIG. 2;

DETAILED DESCRIPTION

FIG. 1

Figure 1:
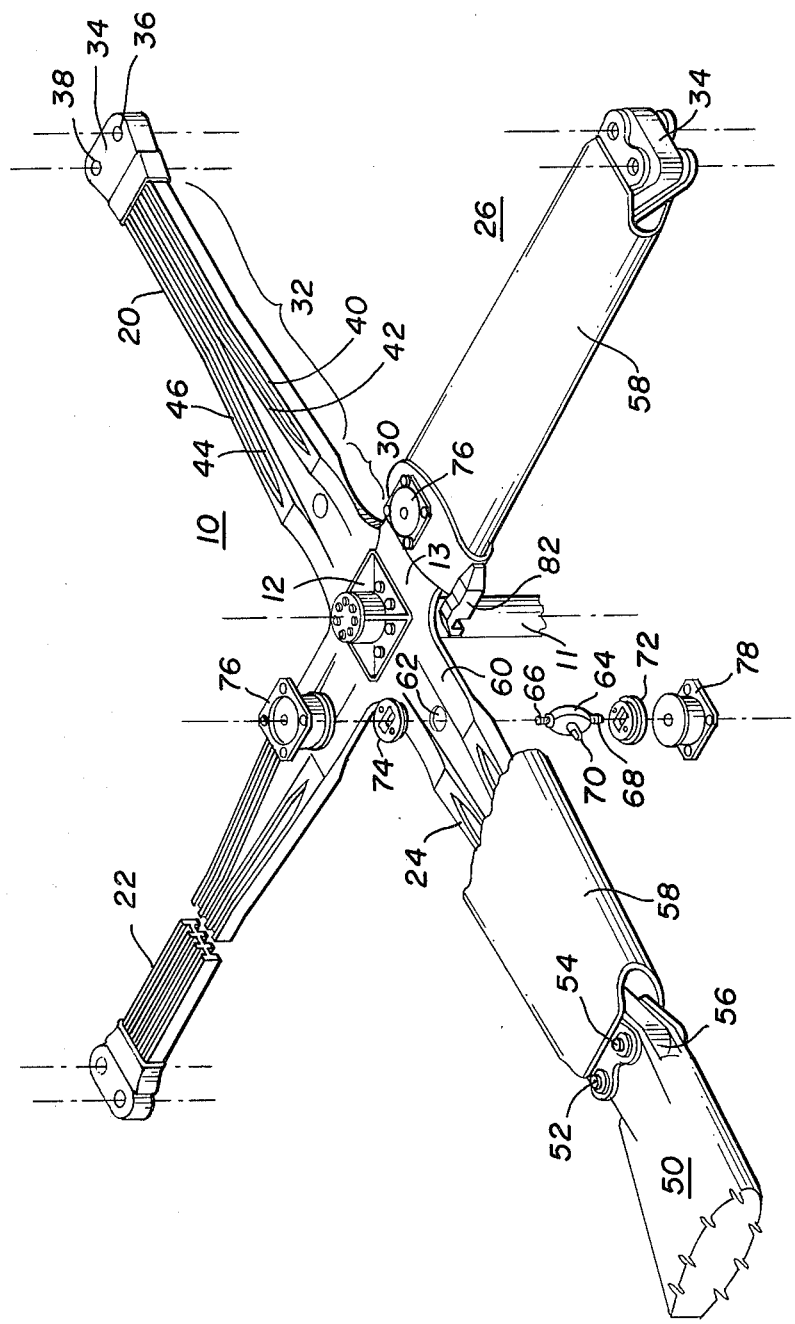
FIG. 1 is an isometric view of a four-bladed rotary yoke in a partial exploded view.

FIG. 1 illustrates a four-bladed rotor yoke 10 mounted rigidly on the upper end of a mast 11 by means of a hub assembly including a pair of hub clamp plates. Only the upper hub clamp plate 12 is visible in FIG. 1.

The hub assembly is characterized by a flat composite fiber-reinforced center yoke section which is secured between the lower face of the upper clamp plate 12 and the upper face of a bottom clamp plate. Four arms 20, 22, 24 and 26 extend from the center hub section 13. The four arms are identical.

Arm 20 comprises a flapping section 30 located immediately adjacent the center hub section 13. A feathering section 32 extends outboard from the flapping section 30 and terminates in a blade bolt attachment structure 34 which is integral with the feathering section 32. The attachment structure 34 has two tangentially-spaced bolt receiving holes 36 and 38.

The feathering section 32 is comprised of four ribs 40, 42, 44 and 46 comprising reinforcing fibers embodied in a solid matrix. The ribs are spaced apart inplane. As will further be explained, fibers in ribs 40 and 42 encircle a fixture defining the bolt hole 36. The fibers in ribs 44 and 46 are formed in a continuous loop that encircles a fixture defining bolt hole 38 and pass through hub section 13 and then outward to and around a like bolt fixture.

Referring to arm 24, the inboard end of blade 50 is shown anchored by bolts 52 and 54 to the attachment structure 56. A cuff 58 in the form of an elliptical composite tube is secured integrally with blade 50, attachment structure 56 and bolts 52 and 54. The cuff 58 extends inwardly and is shown broken away in FIG. 1. It would extend to about a mid-point along the length of the flapping section 60. Structure is then provided for resiliently anchoring the inboard end of cuff 58 to the arm 24 at about the center of the flapping section 60. More particularly, a hole 62 extends vertically through the center of the flapping section 60. A shear restraint structure 64 is provided to be mounted in the aperture 62. The shear restraint element, as will be shown in greater detail, includes vertical studs 66 and 68 forming part of a body having an elastomeric center body bonded inside a circular ring integral with studs 66 and 68. A span-wise stub shaft 70 is bonded in the center of the elastomeric center body. The stub shaft 70 has flattened ends which are thinner than the flapping section 60 at the location of hole 62. Shear restraint 64 is secured in hole 62 by a lower clamp plate 72 and an upper clamp plate 74. The upper stud 66 extends into the lower end of a lead-lag damper fixture 76. The lower stud 68 extends downward into a lead-lag damper fixture 78.

Referring now to arm 26 of FIG. 1, cuff 58 extends inboard from the attachment fixture 34. Cuff 58 is secured to attachment fixture 34 and to blade 50 by blade bolts. The cuff 58 is shown with the upper lead-lag damper 76 mounted in the inboard end of the cuff 58. A pitch horn 82 is secured to the inboard end of the cuff 58.

Thus, it will be understood that the four arms 20, 22, 24 and 26 are identical in construction, each of them being provided with blade bolt attachment fixtures on the outboard end, each of them being attached to the inboard end of a blade and each of them being provided with a cuff which encompasses the feathering section such as section 32 in each arm and extends to the flapping section such as section 30 in each arm. Each cuff is connected through lead-lag dampers to a shear restraint member secured in an opening in the flapping section.

By such structure where the center mounting plate, the flapping elements, the feathering elements and the blade attachment structures are integrally formed in a unitary body utilizing fiber-reinforced composite materials, there can be provided a soft inplane bearingless rotor system with lower weight, greater reliability and lower maintenance than conventional soft inplane rotors which employ bearings. It will be seen that the hub assembly consists of a one-piece composite yoke, composite cuffs, elastomeric shear restraints, elastomeric lead-lag dampers and hub clamp plates.

In FIG. 1, the cuff 58 has been shown as a separate element secured to the blade by the blade bolts. It is to be understood that the cuff could be made an integral part of a blade. This may be particularly desirable where there is no requirement that the blade be foldable for stowage such as on marine vessels. Where there is no requirement for folding the blades, the blade and cuff made integral would be secured to the end of the yoke by fastening means other than the specific structure shown in FIG. 1. In such case, it is possible to provide a rotor system that is lighter in weight than where the blade bolt coupling arrangement as shown is used.

Where two blade bolts are spaced tantentially as in FIG. 1, blade folding is readily accomplished by removing one of the two pins and then pivoting the blade about the remaining pin as described in U.S. Pat. No. 4,252,504. Thus, the fastening structure has been shown with the understanding that modifications thereof may be employed.

Yoke arm 20 is characterized by an inboard flexural element 30 and outboard feathering element 32. Such flexural elements achieve flapping hinge offset from the center of mast 11. The feathering elements replace highly loaded bearings in which, in the prior art systems, oppose the centrifugal force in conventional soft inplane rotors. The feathering section of FIG. 1 allows for tailoring flap-wise, inplane, axial, and torsional stiffness substantially independently. In addition, the feathering section allows the use of filament-wound unidirectional belts which extend from the leading edge attachment bolt on one arm to the trailing edge attachment bolt on the opposite arm. To unify the unidirectional belts, pre-cut ±45° broad goods and unidirectional broad goods are incorporated medially to form web sections and provide the desired stiffness and strength in the yoke for fail-safe operation.

The term "broad goods" as that term is used herein refers to fabrics in which epoxy coated fibers either unidirectional or with ±45° orientation are utilized to be placed in a mold to cure the epoxy to unify the fibers and epoxy.

Cuffs 58 are inboard of blades 50. A metal pitch horn is attached at the inboard end of the cuffs. Metal grip plates are bonded to the outboard end of the cuffs for attachment to the blade and yoke. Cuff 58 is elliptical in shape and is built up with ±45° and unidirectional composites to obtain the desired flap-wise, inplane and torsional stiffness. An elastomeric shear restraint is attached to the yoke at the outboard end of the flapping section. The upper and lower elastomeric lead-lag dampers, which are attached to the inboard end of the cuffs, are attached to the shear restraints. The shear restraints have radial elements for pitch change motion and spherical elements to allow for misalignment due to flapping and lead-lag motion. In order to work the lead-lag dampers and achieve the desired damping, the inplane stiffness of the yoke feathering section is small and the inplane stiffness of the cuff is high.

The invention provides control of the pitch horn position and does not rely on structural and aeroelastic damping alone as do other bearingless rotors.

Metal hub clamp plates attached to the central portion of the yoke provide for transmitting loads through the main rotor shaft 11.

The centrifugal load of the blade is transferred directly to the yoke at the blade-cuff-yoke attachment while the flap-wise and inplane loads are distributed between the cuff and yoke based substantially on their relative flap-wise and inplane stiffnesses. The cuffs react to the greatest portion of the flap-wise and inplane loads since it is the stiffest member both flap-wise and inplane. The blade torsion loads are transmitted to the control system through the cuff. Thus, the structure shown in FIG. 1 eliminates the highly loaded lead-lag and/or flapping bearings of conventional soft inplane rotors. It allows for extensive use of fiber epoxy materials. Because of the presence of multiple independent belts, the blade mounting is rendered substantially fail-safe. It provides a lighter weight rotor due to the extensive use of fiber epoxy materials and the elimination of highly loaded bearings. It provides for an increase in reliability and decrease in maintenance. Unlike other bearingless rotors, it has elastomeric lead-lag dampers and does not solely rely on aeroelastic and structural damping to avoid ground resonance.

FIG. 2

In FIG. 2, a top view of arm 20 is shown. The upper hub clamping plate 12 is illustrated secured to the upper end of the mast by means of a ring of bolts 100. Hub clamp plate 12 is secured by bolts 102 to the hub section 13. Hub section 13 is adjacent to flapping section 30 which changes in the transition region 30a from a wide flat thin plate to a thinner ribbed section. More particularly, ribs 40, 42, 44 and 46 are of uniform width through the feathering section. The reinforcing fibers in the ribs are spread out in transition section 30a as to be distributed uniformly laterally near the lead and lag edges in the structure forming the flapping section 30.

The fibers in ribs 44 and 46 form a continuous loop extending not only around the bolt 38a but pass through and form part of flapping section 30. The fibers then pass under hub clamp plate 12 and then extend through a diametrically opposed arm and encircle a blade attachment bolt. Fibers comprising ribs 44 and 46 encircle a leading attachment bolt on one arm and a trailing attachment bolt on the other end of the diametrically opposed arm.

The fibers forming the ribs 40 and 42 encircle a fixture through which bolt 36a passes. The fibers are dispersed from the rib configuration to a flat configuration in the transition section 30a and pass through the flapping section 30 beneath hub clamping plate 12 and encircle a fixture through which an attachment bolt on the opposite end of the arm passes.

The upper lead-lag damper 76 is shown in FIG. 2 mounted on the surface of the cuff 58 by bolts 104. The pitch horn 82 is secured to the edge of the cuff 58.

FIGS. 3–9

Figure 4:
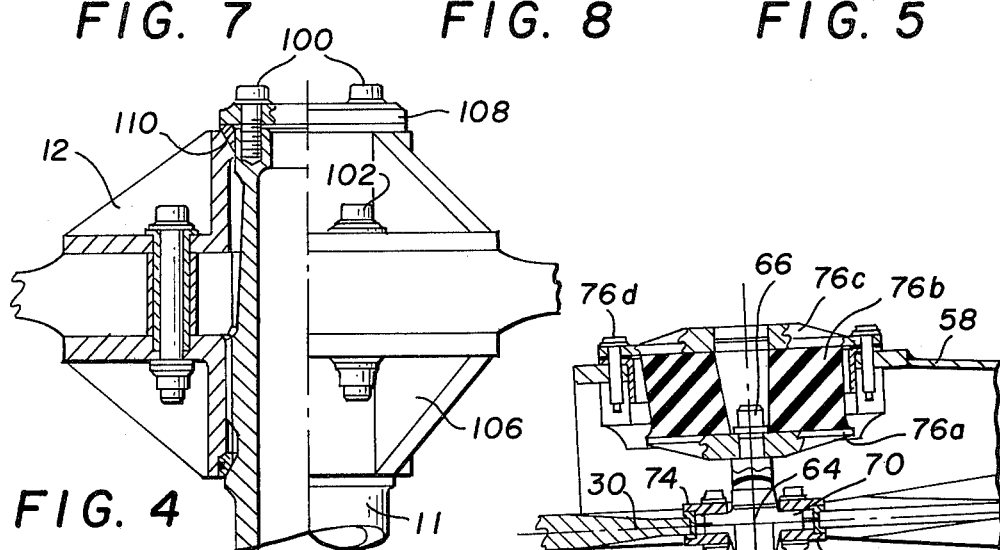
FIG. 4 is an enlarged section partially in view of the hub structure circled at 4 in FIG. 3.

FIG. 3 is an elevation view partially of the section taken along lines 3—3 of FIG. 2. Clamping plate 12 is shown in its relation to the flat center hub section of the yoke with the flapping section 30. The hub section 13 engaged by hub clamp plate 12 is substantially thicker than flapping section 30. The manner in which hub clamp plate 12 is secured to mast 11 is shown in the enlarged FIG. 4. The bottom clamp plate 106 has a splined inner surface which mates with the splined outer surface on mast 11. A locking plate 108 is secured to the upper end of the mast 11 as by bolts 100 with a locking wedge ring 110 engaging the upper end of the upper clamp plate 12. Bolts 102 secure the upper and lower clamp plates 12 and 106 to the flat center section of the yoke.

Flapping section 30, FIG. 3, is substantially tailored in thickness out to the beginning of the transition section 30a.

Figure 5:
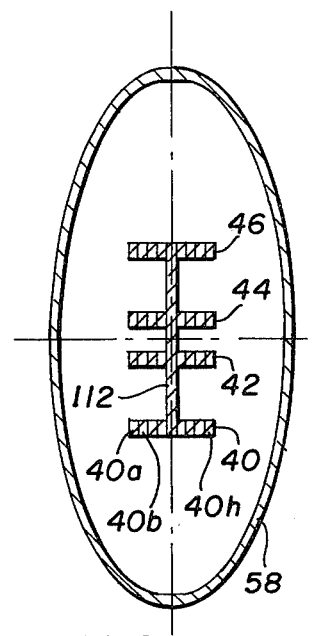
FIG. 5 is a sectional view taken along the lines 5—5 of FIG. 2.

As best shown in FIG. 5, the feathering element is a ribbed beam having ribs 40, 42, 44 and 46. In this embodiment, each rib is made up of eight separate bundles of glass fibers. Ribs 40 and 42 are parts of a first loop. Ribs 44 and 46 are parts of a second loop. Ribs 40, 42, 44 and 46 are integrated into a single body by means of a web 112. Web 112 comprises span-wise glass fibers as well as ±45° fibers all fixed in a cured synthetic bonding body.

Figure 6:
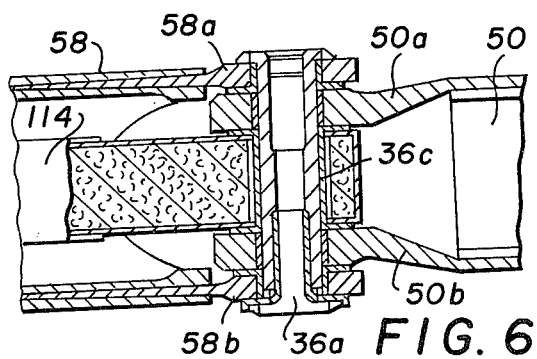
FIG. 6 is an enlarged sectional view of the blade attachment structure circled at 6 in FIG. 3.

Near the outboard end, the rib fibers are retained in an over wrap retainer band 114 of glass fibers wrapped around the beam in the chord-wise direction, FIGS. 3 and 6. Outboard of the retainer band 114, the fibers encircle fixtures for receiving bolts 36a and 38a, FIGS. 3 and 7.

Referring to FIG. 3 and the enlarged FIG. 6, blade 50 is secured by way of blade grips 50a and 50b to the bolt structure 36a. The fiber materials in ribs 44 and 46 encircle bolt structure 36a between grips 50a and 50b, passing around a spool 36c. Cuff inserts 58a and 58b are mounted on bolt 36a immediately outside of the grips 50a and 50b. The inserts 58a and 58b are molded into the outboard end of cuff 58. Thus, the blade, cuff and flex section of the arm are unified at the location of the bolt 36a.

Figure 7:
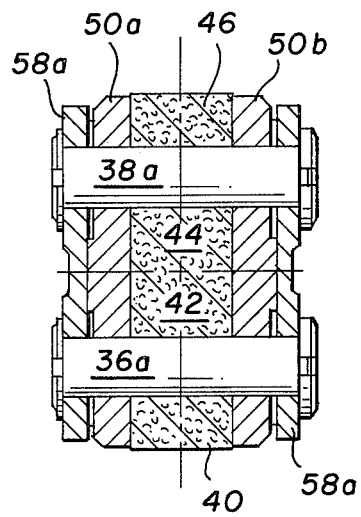
FIG. 7 is a sectional view taken along the lines 7—7 of FIG. 2.

FIG. 7 illustrates a section taken along lines 7—7 of FIG. 2 wherein bolts 36a and 38a are shown as securing together the cuff inserts 58a and 58b, the blade grips 50a and 50b and the plastic embedded fiber bodies 40, 42, 44 and 46.

Figure 8:
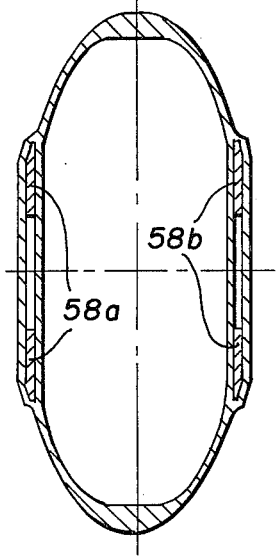
FIG. 8 is a sectional view taken along the lines 8—8 of FIG. 2.

FIG. 8 is a sectional view of the cuff taken along the lines 8—8 of FIG. 2 and shows the inboard ends or tongues of the inserts 58a and 58b molded into the fiber-epoxy elliptical cuff structure near the end adjacent to the attachment fixture 34.

Figure 9:
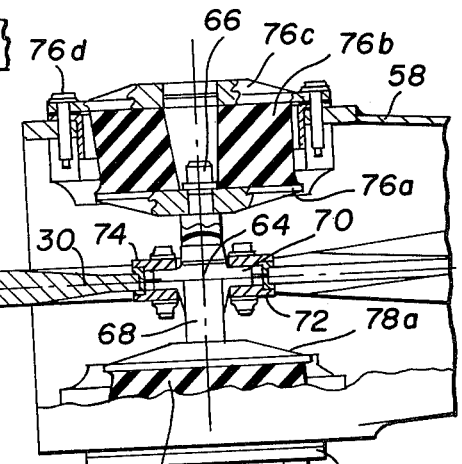
FIG. 9 is an enlarged view partially in section of the damper structure circled at 9 in FIG. 3.

FIG. 9 is an enlarged view of the soft inplane coupling between the flapping section 30 and the inboard end of the cuff 58. The shear restraint 64 is shown mounted in an aperture in the flapping section 30 by means of clamp rings 72 and 74. The upper stud 66 of the shear restraint unit 64 is anchored to a bottom plate 76a of the lead-lag damper unit 76. Damper unit 76 is provided with an elastomeric body 76b which is bonded to the upper surface of plate 76a. The upper surface of the body 76b is bonded to the lower plate surface of an upper plate 76c. The plate 76c is secured by bolts 76d in an aperture in the upper surface of the cuff 58.

Similarly, the lower stud 68 is secured in a plate 78a with an elastomeric body 78b bonded to a lower plane surface of the plate 78a. The body 78b is bonded to the upper plane surface of the lower plate 78c which, in turn, is secured in the lower portion of cuff 58 by bolts 78d. It will be noted that the elastomeric bodies 76b and 78b are donut shaped with a central aperture through which nuts may be inserted threaded onto the upper end of stud 66 and onto the lower end of stud 68 in order to secure the same to plates 76a and 78a, respectively.

FIGS. 10–12

Figure 10:
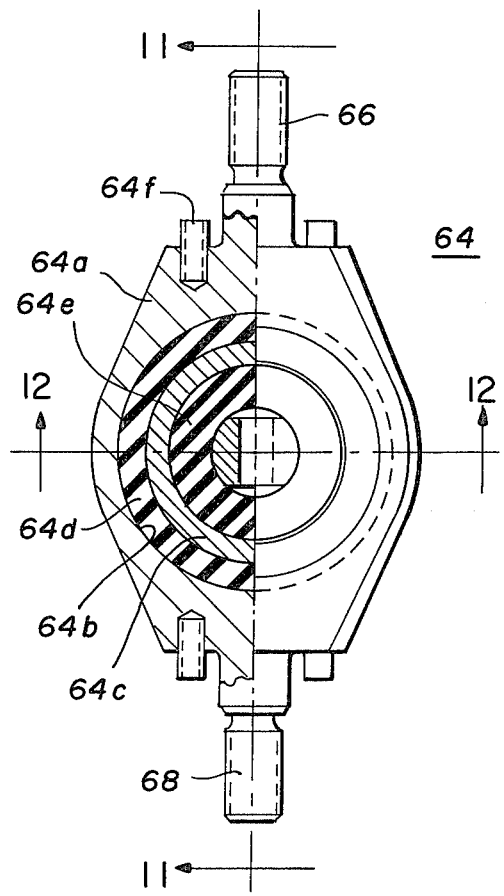
FIG. 10 is an enlarged view partially in section of the shear restraint 64.
Figure 11:
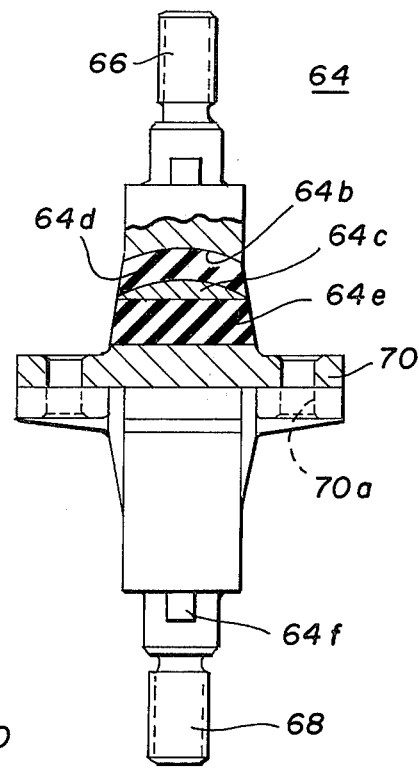
FIG. 11 is a partial sectional view of the shear restraint taken along the lines 11—11 of FIG. 10.
Figure 12:
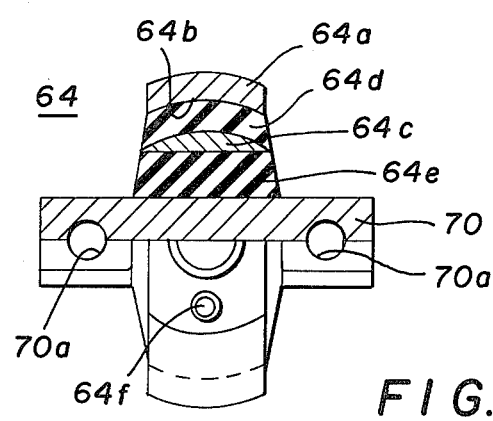
FIG. 12 is a partial sectional view taken along the lines 12—12 of FIG. 10.

FIGS. 10, 11 and 12 illustrate in more detail the construction of one embodiment of the shear restraint 64. Studs 66 and 68 are shown as an integral part of a ring-like frame 64a which is provided with a circular central bore 64b. A metallic ring 64c is bonded to an outer rubber ring 64d and to an inner rubber ring 64e. Ring 64d is bonded in bore 64b. The central shaft 70 is bonded to the interior of the central rubber body 64e.

Pins 64f are provided near studs 66 and 68 for registration in ports in the shear restraint unit such as units 76 and 78.

It will be apparent that the shaft 70 as seen in FIGS. 10 and 11 has flattened ends. It will also be noted that the metal ring 64c has a cylindrical center bore and a spherical outer surface mating with the sperically shaped rubber ring 64d. Shaft 70 has holes 70a in the ends thereof through which bolts which mount the clamp rings 72 and 74 may pass.

In one embodiment, each of the eight belts 40a–40h, FIG. 5, was 0.290 inches wide and 0.216 inches thick. Each belt comprised about 29 circuits of 60 end count S2 prepregnated fiber glass rovings.

The web section 112 comprised 8 layers of ±45° SP250 glass broad goods. The web section had a thickness of 0.150 inches and width varying from 7.75 inches at the flap section to about 4.0 inches at the outboard end.

A lead-lag damper set according to this invention preferably will have an elastic spring rate of 2500 lbs./inch and a loss tangent of 0.6 where loss tangent is known to be the ratio of the damping force to the elastic force exerted by the lead-lag damper.

Suitable total torsional stiffness of each of the beams is approximately 200 inch lbs. per degree with centrifugal forces present.

The total flapping moment on the mast for such a beam or arm may be about 5000 inch lbs. per degree of flapping per blade.

FIG. 13

Figure 13:
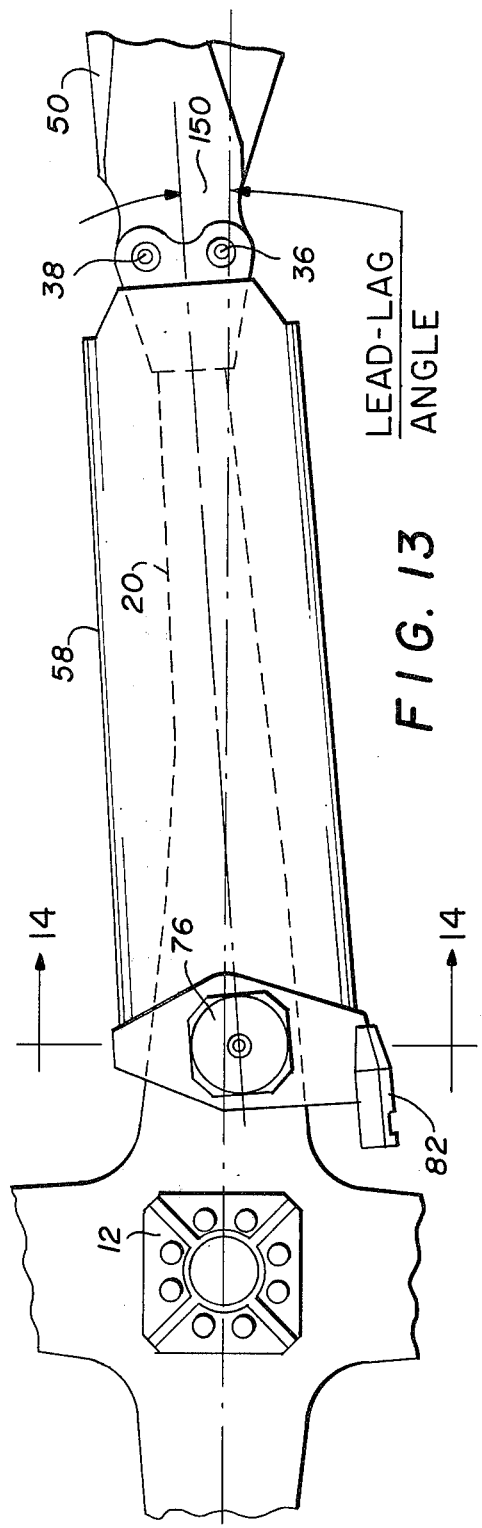
FIG. 13 diametrically illustrates the lead-lag function of the present invention.

FIG. 13 illustrates operation of the system. Blade 50 and beam 20 are displaced from the normal position by a lead-lag angle 150. In this condition, the arm 20 is deflected or bent inplane. Cuff 58 remains substantially unbent or rigid to apply a force through dampers 76 and 78. This deforms the rubber elements 76b and 78b to accommodate the change in lead-lag angle. Thus, the resilient lead-lag dampers together with the inplane flexibility of the yoke in operation with the rigid cuff allows for inplane lead-lag blade motion. The inplane lead-lag frequency preferably is made 0.7 times the rotational speed which is below the 1 per rev. level at the operation RPM by utilizing the proper balance of yoke, damper, and cuff stiffness. This frequency displacement is below the 1 per rev. level and is called "soft-inplane." Previous rotors having an inplane frequency higher than the rotational speed, i.e., above 1 per rev. are called "stiff inplane systems."

Figure 14:
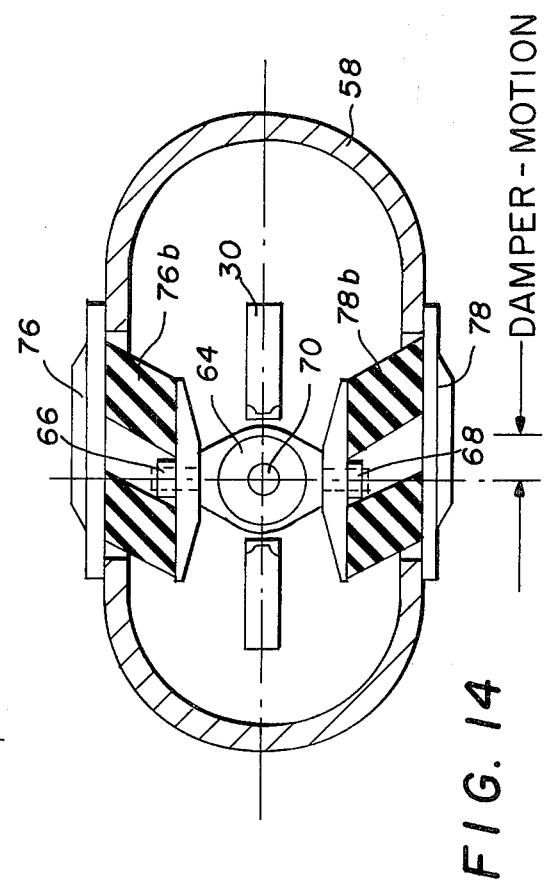
FIG. 14 is a sectional view taken along the lines 14—14 of FIG. 13.

Multi-bladed rotors whose inplane frequency is below 1 per rev. can be subject to ground resonance or air resonance instabilities. The damping properties of the elastomeric damper of the present invention provides the damping to stabilize such instabilities. Dampers 76 and 78 of the present system provide a restraint force as is indicated in FIGS. 13 and 14. As blade 50 leads or lags in an oscillatory manner, the elastomeric dampers 76 and 78 are exercised by the relative motion of the damper attachment at the cuff and the shear restraint bearing. The elastic restoring force from the damper is in phase with the damper displacement. The damper force is in phase with the damper velocity. Thus, the elastomeric damper provides both elastic properties and damping properties to the rotor system. The yoke and cuff maximize the energy at the damper and, in turn, maximize the damping provided for the blade 50.

We claim:

1. A soft inplane bearingless rotor to be rigidly mounted on a helicopter mast comprising:
   (a) a unitary yoke having a flat hub section adapted to be anchored to the end of said mast and having diametrically opposed blade-supporting arms extending from said hub section, each arm having a thin flapping section adjacent said hub section and a feathering section extending from said flapping section with blade attachments at the end of each of said arms, said arms including a plurality of fiber reinforced composite parallel ribs extending span-wise with predetermined inplane spacing;
   (b) a blade secured to each attachment with a cuff extending inboard to said flapping section; and
   (c) bearing structure interconnecting the inboard end of said cuff and said flapping section and including inplane resilient structure for soft inplane restraint of said blade.

2. The combination set forth in claim 1 wherein said ribs are medially joined by a common flat web of cured fiber-epoxy broad goods.

3. The combination set forth in claim 1 wherein said bearing structure includes a shear restraint mounted in a port extending through said thin flapping section and anchored in cuff-mounted resilient inplane elastomeric bearings above and below said flapping section.

4. The combination set forth in claim 1 in which said cuffs are tubular and elliptical in cross-sections to be stiff inplane for working said bearing structures when said arms undergo lead-lag motion.

5. The combination set forth in claim 4 in which four pitch horns are attached to the inboard end of said cuffs for change of pitch of said blades by forcing flexure of said arms.

6. A soft inplane bearingless rotor to be rigidly mounted on a helicopter mast comprising:
   (a) a unitary yoke having a flat hub section adapted to be anchored to the end of said mast and having an even number of diametrically opposed blade-supporting arms extending from said hub section, each arm having a thin flapping section adjacent said hub section and a feathering section extending from said flapping section with blade attachments at the end of each of said arms, said arms comprising plural fiber reinforced composite ribs with inplane spacing;
   (b) a blade secured to each said blade attachment with cuff extending inboard to said flapping section; and
   (c) bearing structure interconnecting the inboard end of said cuff and said flapping section and including inplane resilient structure for soft inplane restraint of said blade.

7. A soft inplane bearingless rotor to be rigidly mounted on a helicopter mast comprising:
   (a) a unitary yoke having a flat hub section adapted to be anchored to the end of said mast and having at least three uniformly spaced radial blade-supporting arms extending from said hub section, each arm having a thin flapping section adjacent said hub section and a feathering section extending from said flapping section with blade attachments at the end of each of said arms, said arms comprising plural fiber-epoxy composite parallel ribs with predetermined inplane spacing and unified by a medial fiber-epoxy flange structure;
   (b) a blade secured to each said blade attachment with a cuff extending inboard to said flapping section; and
   (c) bearing structure interconnecting the inboard end of said cuff and said flapping section and including inplane resilient structure for soft inplane restraint and damping of said blade.

8. A soft inplane bearingless rotor to be rigidly mounted on a helicopter mast comprising:
   (a) a unitary yoke having a thick flat hub section adapted to be anchored to the end of said mast and having diametrically opposed blade-supporting arms extending from said hub section, each arm having a thin flapping section adjacent said hub section and a feathering section extending from said flapping section with blade attachments at the end of each of said arms, said arms including a plurality of fiber-epoxy parallel ribs extending span-wise and interconnected to maintain inplane spacing of said ribs;
   (b) means for securing a blade to each said blade attachments and for securing a cuff as to extend inboard to said flapping section; and
   (c) bearing structure interconnecting the inboard end of said cuff and said flapping section and including inplane resilient structure for soft inplane restraint of said blade.

9. A soft inplane bearingless rotor to be rigidly mounted on a helicopter mast with foldable blades comprising:
   (a) a unitary yoke having a flat hub section adapted to be anchored to the end of said mast and having diametrically opposed blade-supporting arms extending from said hub section, each arm having a thin flapping section adjacent said hub section and a feathering section extending from said flapping section with a pair of tangentially spaced blade bolt attachments at the end of each of said arms, said arms including a plurality of fiber reinforced composite parallel ribs extending span-wise with predetermined inplane spacing;
   (b) a blade secured to each said blade bolt attachments;
   (c) a cuff secured to said attachments and extending inboard to said flapping section; and (d) bearing structure interconnecting the inboard end of said cuff and said flapping section and including inplane resilient structure for soft inplane restraint of said blade through said cuff.

10. The combination set forth in claim 9 wherein said ribs are medially joined by a common flat web of cured fiber-epoxy broad goods.

11. The combination set forth in claim 9 wherein said bearing structure includes a shear restraint mounted in a port extending through said thin flapping section and anchored in cuff-mounted resilient inplane elastomeric bearings above and below said flapping section.

12. A soft inplane bearingless rotor to be rigidly mounted on a helicopter mast comprising:
(a) a unitary yoke having a flat hub section adapted to be anchored to the end of said mast and having an even number of diametrically opposed blade-supporting arms extending from said hub section, each arm having a thin flapping section adjacent said hub section and a feathering section extending from said flapping section with blade attachments at the end of each of said arms, said feathering section formed of plural stacked loops of fiber-epoxy material forming inplane spaced ribs with said loops encircling said blade attachments on diametrically opposed arms;
(b) a blade secured to each said blade attachments with cuff extending inboard to said flapping section; and
(c) bearing structure interconnecting the inboard end of said cuff and said flapping section and including inplane yieldable structure for soft inplane restraint of said blade.

13. A yoke for a soft inplane bearingless rotor to be rigidly mounted on a helicopter mast comprising:
(a) a flat hub section adapted to be anchored to the end of said mast;
(b) an even number of diameterically opposed blade-supporting arms extending from said hub section;
(c) each said arm having a thin flapping section adjacent said hub section and a feathering section extending from said flapping section; and
(d) blade attachments at the end of each of said arms and said feathering sections including a plurality of looped fiber-epoxy material stacked to form a plurality of ribs spaced apart inplane with each said loop encircling said blade attachments on diametrically opposed arms.

* * * * *